(12) United States Patent
Park

(10) Patent No.: US 10,001,385 B2
(45) Date of Patent: Jun. 19, 2018

(54) ONLINE STREET SAFETY MAP SYSTEM DISPLAYING CRIME DENSITY AND TRAFFIC ACCIDENT DATA

(71) Applicant: Sang Jun Park, Fairfax, VA (US)

(72) Inventor: Sang Jun Park, Fairfax, VA (US)

(73) Assignee: Sang Jun Park, Fairfax, VA (US)

( * ) Notice: Subject to any disclaimer, the term of this patent is extended or adjusted under 35 U.S.C. 154(b) by 0 days. days.

(21) Appl. No.: 15/321,994

(22) PCT Filed: Jun. 25, 2015

(86) PCT No.: PCT/US2015/037613
§ 371 (c)(1),
(2) Date: Dec. 23, 2016

(87) PCT Pub. No.: WO2015/200585
PCT Pub. Date: Dec. 30, 2015

(65) Prior Publication Data
US 2017/0131115 A1    May 11, 2017

Related U.S. Application Data

(60) Provisional application No. 62/017,316, filed on Jun. 26, 2014.

(51) Int. Cl.
*G01C 21/36* (2006.01)
*G09B 29/00* (2006.01)
(Continued)

(52) U.S. Cl.
CPC ..... *G01C 21/3694* (2013.01); *G01C 21/3697* (2013.01); *G06F 17/30061* (2013.01);
(Continued)

(58) Field of Classification Search
CPC ............ G01C 21/3694; G01C 21/3697; G06F 17/30061; G06F 17/30241; G06G 50/265; G09B 29/007
(Continued)

(56) References Cited

U.S. PATENT DOCUMENTS 6,175,803 B1 * 1/2001 Chowanic .............. G01C 21/34
340/988
8,289,171 B2  10/2012 Morley
(Continued)

OTHER PUBLICATIONS

International Search Report dated Sep. 21, 2015, issued in counterpart International Application No. PCT/US2015/037613 (2 pages).
(Continued)

*Primary Examiner* — Yazan Soofi
(74) *Attorney, Agent, or Firm* — Charley Brown

(57) ABSTRACT

An interactive street safety map system for internet, GPS, and mobile users is disclosed. The system is designed to identify crime and traffic accidents information at street level. Each street segment on the map indicates low to high density of crime and traffic accidents in different colors in order to improve public perception of safety on each of the streets displayed. The system includes crime and traffic accident data, and the system users can query the data for their interest locations, crime types, crime date and time of occurrence, and the number of crime incidents and traffic accidents. Ultimately, the online street safety map allows users to choose relatively low risk of crime and traffic accident streets for their own safety. The system harvests crime and traffic information data from police departments through Computer-Aided Dispatch (CAD), Recorded Management Systems (RMS), and other crime and traffic information sharing services.

20 Claims, 6 Drawing Sheets

(51) Int. Cl.
*G06F 17/30* (2006.01)
*G06Q 50/26* (2012.01)

(52) U.S. Cl.
CPC ..... *G06F 17/30241* (2013.01); *G06Q 50/265* (2013.01); *G09B 29/007* (2013.01)

(58) Field of Classification Search
USPC ........................................................ 701/454
See application file for complete search history.

(56) References Cited

U.S. PATENT DOCUMENTS

| | | | |
|---|---|---|---|
| 8,290,705 B2 | 10/2012 | Trinko et al. | |
| 8,515,673 B2 | 8/2013 | Trinko et al. | |
| 9,230,440 B1* | 1/2016 | Penilla | G08G 1/145 |
| 2009/0322743 A1 | 12/2009 | Rubin et al. | |
| 2010/0036717 A1* | 2/2010 | Trest | G06Q 30/0207 |
| | | | 705/14.1 |
| 2011/0084967 A1 | 4/2011 | De Pauw et al. | |
| 2011/0181443 A1* | 7/2011 | Gutierrez | G01C 21/3691 |
| | | | 340/990 |
| 2011/0213628 A1 | 9/2011 | Peak et al. | |
| 2012/0123806 A1 | 5/2012 | Schumann, Jr. et al. | |
| 2014/0085107 A1* | 3/2014 | Gutierrez | G08G 1/096766 |
| | | | 340/905 |

OTHER PUBLICATIONS

Written Opinion dated Sep. 21, 2015, issued in counterpart International Application No. PCT/US2015/037613 (4 pages).

* cited by examiner

ONLINE STREET SAFETY MAP SYSTEM DISPLAYING CRIME DENSITY AND TRAFFIC ACCIDENT DATA

FIELD OF THE INVENTION

The present application discloses a system for displaying crime data on a map. In particular, the present invention is directed toward an interactive street safety map designed to identify crime and/or traffic accidents along street segments.

BACKGROUND OF THE INVENTION

FIG. 1 is a copy of a prior art screen image from a web mapping service that displays a mobile device user's present location and his/her surrounding streets. As shown in FIG. 1, a user's location 110 is denoted by a dot on the map of the display 100. The user's location 110 is shown relative to street 120 (e.g., 13$^{th}$ St NW) and point of interest 130 (e.g., McPherson Square Metro station) that are proximal to the user's location 110. In addition, criminal activity is indicated by dots 140 throughout the map. Crime mapping systems that display crimes as dots 140 may be effective to show all crime/traffic incidents as single events. Information about each incident, including the type of crime, day and time of incident, and street address, may be geo-located at a micro-level. However, overall crime patterns, descriptions/frequencies, and crime rates based on statistical street comparisons are not provided. Due to this shortcoming, users have to rely on their own judgment to find out which streets have large and small amounts of criminal activity. This subjective judgment does not bring accurate results pertaining to crime-related information. Thus, to provide more accurate and useful information regarding crime-related information, an enhanced system offering more various information and features (i.e., overall crime patterns, descriptions/frequencies, and crime rates) is required.

Furthermore, a mapping system with a 'dot' feature does not show accumulated crime/traffic incidents at the same place. In addition, such mapping system has difficulty in displaying large amount of location data onto a map. Such system would have difficulty clearly showing a number of crime points in areas with high crime density, especially when a map is zoomed out. In other words, the crime points would be lumped together as the individual dots blur, which would make finding out an exact point difficult.

Existing map services gather crime information and may also present shaded areas to represent crime statistics. FIG. 2 is a copy of a prior art screen image of a crime or traffic accident hot spot map having a color scheme that shows a graphical representation of criminal and traffic accidents risk on an aerial map, i.e., a so-called "heat map." As shown on FIG. 2, display 200 illustrates, proximal to user's location 210, each point of crime data that fits in a smoothly tapered surface by calculating magnitudes per unit area 220, 230. Most providers of crime data do not release detail geolocation to protect privacy. To comply with the public regulations, law enforcement services provide crime data in one hundred block level of street addresses, wherein the last two digits of the address are hidden. E.g., 006XX E 89TH PL, Chicago, Ill. For this reason, geocoded points of the event on the maps would be inaccurate with where the event actually occurs. While such heat map presentation provides a user with the rough idea where crimes are occurring, this presentation does not associate the crime activity with particular street segments.

Further, a heat map provides a smoothly tapered surface that only shows high clustered crime and traffic accident approximate locations, and omits detailed location information for less reported incidents such as murder, rape, and kidnapping, even though these are severe, felony types of crime.

In addition, a heat map often misidentifies a low risk area as high risk area, and vice-versa, during data trimming and shading style algorithms. In addition, depending on the granularity of the shading styles, the crime rate may widely vary within a particular shaded area. In addition, within a particular shading style, the differences in crime types and rates are not effectively revealed. All types of crime are shaded as a color, no matter what crime types and rates are present. For instance, if a person should look for a place to live within a high crime area, which is typically colored as red, the shaded style map does not provide any detail and further information besides the red shade, nor any differences within the shaded area.

The heat map is also an inappropriate method for illustrating small areas, as the user zooms in his/her view of the map. The heat map only provides an overview of crime and traffic accident density at macro zoom levels.

Such prior art systems are presented in, for example, U.S. Pat. Nos. 8,289,171; 8,290,705; and 8,515,673, each of which is incorporated by reference herein.

What is needed is an interactive map that provides travel information by displaying street segments that should be avoided, because, for example, there has been a high rate of crime or accidents occurring thereon.

SUMMARY OF THE INVENTION

The present invention effectively provides crime and traffic accident information along street segments. The present invention is more effective than the prior art, because the invention conveys which street segments that a traveler should avoid. The present invention is designed to improve public safety through displaying street hot spot segments, which informs a user of previous crime and traffic accident locations.

In one aspect, the present invention is directed to an online street safety map system that provides public safety information in detail. The system generates a map that includes: (i) an internet street map from online map service agencies; (ii) crime and traffic information data from police departments; (iii) a street hot spot map that display collected crime and traffic information. The map can be displayed in a myriad of different scales; and (iv) a dynamic display of street and aerial density map including a color scheme that depicts the severity of crime and accident data by using different colors. Further the map can either provide: (a) dynamic display of a crime and traffic incident linked to street segments in a small scale based on the position of the system users or any other places upon users' request at micro-level of viewing areas; or (b) dynamic display of an aerial density of crime and traffic incident shaded hot spots following the position of the system users or any other places upon request at macro-level of viewing areas.

In another aspect, the present invention is directed to crime and traffic information data that includes major crime types, number or crime incidents, crime incidents time and location, sexual offenders, traffic accident types, number of traffic accidents, traffic accident location and time.

In another aspect, the present invention is directed to a map wherein the crime hot spots provide shading that reflects a density of crime and traffic incidents.

In another aspect of the present invention, crime and traffic information data is further queried in different ways to generate hot spots map by users' manipulation.

In yet another aspect, the present invention is directed to a method of improving street safety comprising the steps of: (a) using a navigation receiver to obtain substantially real time location information related to a position of the system users using the navigation receiver and receive crime and traffic information data; (b) generating a street crime hot spots map following the position of the system users; or (c) generating a street crime hot spots map selected by the users' interest areas through executing a site-specific script to extract specific locations; (d) generating a dynamic display of traffic accidents hot spots on streets map linked to users' locations; and (e) providing a traffic accidents map using the results of the queried database for a particular map area.

In another aspect of the method, crime data is derived from the linked data providers.

In another aspect of the method, traffic accident data is derived from crime data provided on accessible websites.

In yet another aspect, the present invention is directed to a method of displaying data comprising: (a) importing crime and traffic data through CAD and RMS; (b) executing a program to read the database and extract traffic accidents and crime location, types, and time, based on the system user's location and any other different locations; and (c) generating a hot spots map that reflects crime and traffic information joined to the closest street segment; and outputting the street safety map in human readable form to users.

DETAILED DESCRIPTION OF THE INVENTION

Figure 1:
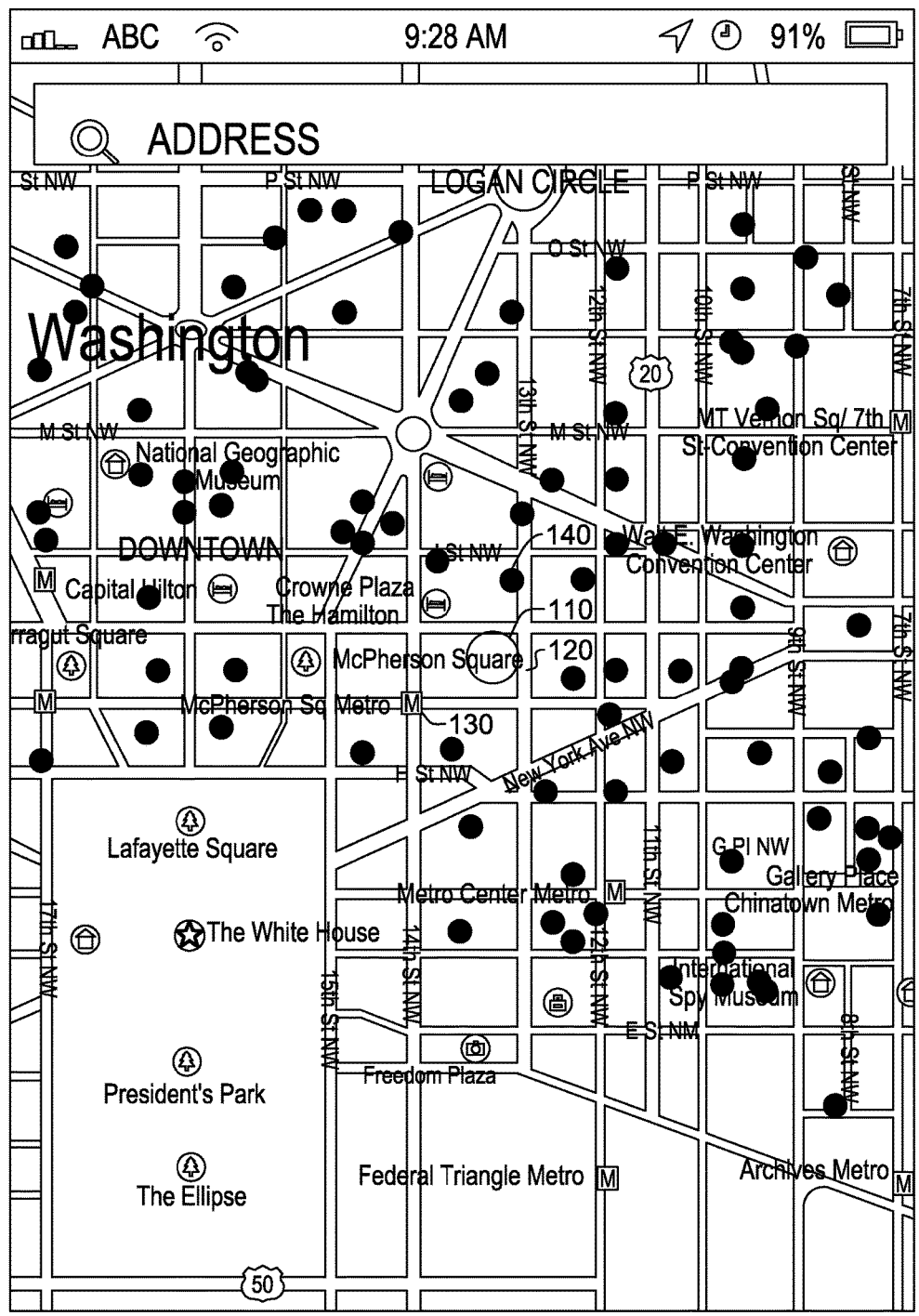
FIG. 1 is a copy of a prior art screen image from a web mapping service that displays a mobile device user's present location and his/her surrounding streets.
Figure 2:
FIG. 2 is a copy of a prior art screen image of a crime or traffic accident heat map providing a graphical representation of criminal and traffic accidents risk on an aerial map.

The present invention provides a traveler with crime and traffic accident density along streets, presented in both street and aerial views of a graphic representational map.

Global positioning system (GPS) receivers, navigation systems, and mobile devices enable access to an online street safe map provided by the present invention from any mobile network environments and transmit mobile device's location information to the online street safety map server and receive local crime and traffic accident information to system users simultaneously.

The system improves public perception of crime and traffic accident risk areas and prevents victimization from the lack of risk location information. The present invention permits visualization of crime and traffic incidents at street segments separated by intersections. Street segment display is beneficial because crime and traffic accidents occur on a street by street basis due to societal and environmental differences, among other things, that may be present along each street segment.

The present invention provides a GPS system that provides a graphical display of the risk of criminal activity in the area to put a traveler to an unfamiliar city on a more equal footing with those more familiar with the area. By giving travelers a more complete picture of their surroundings, such data can assist the traveler in making informed decisions about travel routes, stopping points, and schedules. The graphical display of criminal activity risk can distinguish between different types of criminal activities, the severity of the risk, the geographic scope of the risk, and even the risk as a function of time of day. This unique and innovative crime mapping technology is designed to reinforce current existing technical issues, which pertain to the methods of either 'dot' (featured as point) and/or 'shade' (featured as heat map). Given the shortcomings in crime and traffic accident mapping system, the present invention provides an indication of actual crime/traffic incidents on street segments. This new feature will help Internet users not only to visualize the crime rate easily and effectively but also to compare crime incidents street-by-street. This is a key point helps to distinguish the present invention from other online crime mapping systems.

Significantly, the present invention also provides a method of obtaining detailed crime data on a contemporaneous basis from diverse public sources and for using that crime data for route planning purposes and informational display. The system gathers primary crime and traffic data from governmental entities, such as police departments. Crime and traffic information data is harvested from police departments through Computer-Aided Dispatch (CAD), Recorded Management Systems (RMS), and other crime and traffic information sharing services. The collected crime and traffic accident data is publicly available for safety of the public. Such data is reliable, due to the credibility of government sources. Many police departments share crime data with public by displaying such data on their websites. See, e.g., Chicago crime data website at https://data.cityofchicago.org/Public-Safety/Crimes-2001-to-present/ijzp-q8t2. The system can also gather secondary data from the public. Such data or reports are displayed based on sensitivity. For example, location information may be displayed on the map, but detail descriptions of human subject such as pictures or home address of individual are not open to the public. The invention provides users with predetermined icons and comments windows to report their concerns and select whether they want to share the data with public or public agencies (such as the police).

Specifically, the present invention provides a method and apparatus for improving traveler safety comprising a GPS receiver that obtains substantially real time location information related to a position of the system users. The system presents a dynamic display of a street map following the position of the travelers using stored street map data is together with historical crime and traffic accident density areas in the dynamic display of the street map. The frequency of crime and traffic accident data is depicted in the locations of the shaded zones using the data linked to locations. The online street safety map also can display points of interest with accompanying information about crime and traffic in that area.

It is thus one object of the invention to provide any travelers who are new to an area with a guide illustrating crime and traffic accident danger associated with particular street locations. The crime and traffic accident data may be derived from crime data provided on publicly accessible systems operated by governmental entities or from publicly available data sources or websites.

It is thus another object of the invention to provide a method of obtaining accurate crime and traffic accident data in a cost-effective manner.

The crime and traffic accident data may be derived from non-crime data, but that can be correlated with crime and traffic accident data provided on publicly accessible websites.

The crime and traffic accident data can include different types of crime and can display the hot spots maps to different degrees of crime and traffic accident frequency. The street hot spot areas are derived from the density of crime and traffic data.

It is thus an object of the invention to provide a user with the ability to make a personalized risk assessment.

The crime and traffic accident data includes day and time of incidents, which may change color schemes or location of hot spots based on user selection. It is thus an object of the invention to provide a realistic indication of crime and traffic accident that changes based on a different time of day. It is thus a further object of the invention to provide an accurate assessment of seasonal type crimes. It is also an object of the invention to improve the predictive power of the crime and traffic assessment by location.

It is thus an object of the invention to show lower risk paths to a traveler who wishes to avoid high crime and traffic accident areas.

The crime and traffic accident hot spots can reflect a particular crime type, which can be displayed on streets or aerial maps according to a map scale. It is thus an object of the invention to provide an accurate representation of crime and traffic accident risk to unsophisticated users.

The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, Visual Basic, Python, CGI, PHP or the like, with the various algorithms being implemented with any combination of data structures, objects, processes, routines or other programming elements.

The object code created for the computers can preferably be executed by any general purpose computer such as a personal computer having an appropriate operating system such as Linux, WINDOWS™ or OSX™ and an appropriate browser such as INTERNET EXPLORER™, NETSCAPE™, CHROME™ or SAFARI™.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of a software embodiment stored in memory that is run by a processor, or an entirely hardware embodiment. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

System Architecture

Figure 3:
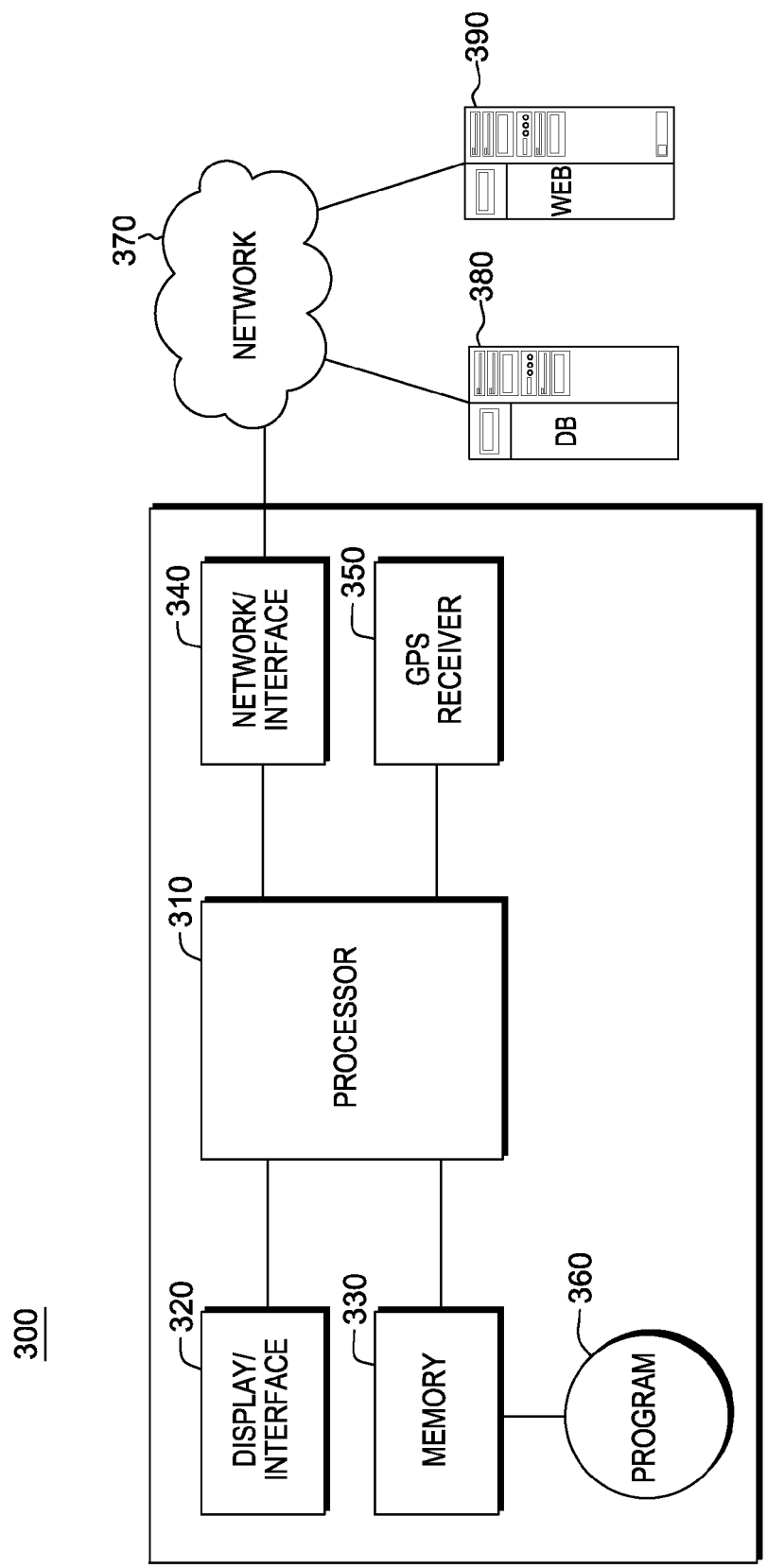
FIG. 3 is a block diagram that illustrates computer architecture of a preferred embodiment of the present invention for indicating crime and traffic accident location information on a street map.

FIG. 3 is a block diagram that illustrates computer architecture of a preferred embodiment of the present invention for indicating crime and traffic accident location information on a street map. In a preferred embodiment, the system and method of the present invention are directed to system 300 in communication with a database server 380 through a network 370, such as the Internet. As shown on FIG. 3, system 300 includes a processor 310, a display/interface 320, a memory 330, a network interface 340, a global positioning system (GPS) receiver 350, and a computer program 360. System 300 is coupled through network interface 340 to one or more computers on network 370 that send system 300 data. Network 370 may comprise, for example, the Internet, a wide area network (WAN), or a local area network (LAN). Network 370 may include a plurality of network computers or server computers (not shown), each of which may be operatively interconnected. Where network 370 comprises the Internet, data communication may take place over communication links via an Internet communication protocol (UDP/IP or TCP/IP). Where network 370 comprises a wireless network, data communication may take place over communication links via a wireless data protocol such as CDMA2000 or W-CDMA. Similarly, where network 370 communications comprise data, voice and video, communication may take place via an Internet communication protocol or a wireless protocol.

System 300 comprises software program 360 that is loaded into memory 330 and executed by processor 310 in system 300. As is well-known in the art, system 300 could equally be implemented as a client/server software system, where data processing tasks are performed on computing devices on network 370 that system 300 communicates with. In such event, software program 360 comprises a Web server application that runs on a Web server 390 that listens for TCP/IP (transport control protocol/Internet protocol) connections on a well-known port and receives standard HTTP (hyper-text transfer protocol) requests on that port that identifies particular URL (universal resource locator) that indicates Web pages and other information requested, typically by Web browser, on system 300. Preferably, Web server application comprises Apache and a collection of software modules that generate HTML (hyper-text markup language) Web pages. In alternate embodiments, the functions performed by Web server computer 390 are split among several server computers, for example, having components of Web server application executed on computers different from database server 380. Furthermore, these servers may be geographically separated and, for example, coupled through network 370.

Memory 330 may include dynamic random access memory, read-only memory, or persistent storage.

In addition, system 300 retrieves information from one or more databases stored on database server 380 in communication with system 300 via network 370. A database server application runs on database server 380 coupled to system 300, and provides an interface to the information stored in databases to application software modules in program 360 that execute on system 300. In a preferred embodiment, the database is a relational database, which includes a number of interrelated tables. Database server application is preferably an SQL (structured query language) server that accepts queries according to SQL syntax and provides responses to those queries. Database server application can perform stored database procedures comprising complex queries stored in SQL syntax on database server computers coupled to system 300. Such queries may involve multiple fetching processes from more than one table in the tables that comprise the database. Stored database procedures are stored in a file system on database server 380.

In a preferred embodiment, software program 360 on system 300 comprises a Web browser, such as INTERNET EXPLORER™, NETSCAPE™, CHROME™, SAFARI™ or other Web browser pre-loaded into memory 330 of system 300, or readily-available for download from the Internet into memory 330. Such browsers retrieve Web pages from a Web server in response to inputs on display/interface 320. Web pages are loaded into memory 330 and then rendered on display/interface 320. In an alternative embodiment, a dedicated, client-based application is installed on system 300, wherein such client-based application may use alternate communication protocols from HTTP (hyper-text transfer protocol).

Display/interface 320 comprises controls that are preferably graphically represented buttons with symbols commonly found in many Web pages to permit entry of information or selection of actions. Display/interface 320 may include a keyboard, mouse or other pointing device, or other information or control input device that affects the operation of system 300, as is well known in the art. Display/interface 320 may also comprise a microphone that provides the user with a means to convey digitized audio information.

Display/interface 320 comprises a CRT (cathode ray tube) or LCD (liquid crystal display), or other visual display device as is commonly known in the art. Display/interface 320 may further comprise speakers that receive digitized audio signals and emit audio output audible to the user. As is well known in the art, speakers may also be in a headset that comprises a microphone.

Under control of program 360, processor 310 receives user location information via GPS receiver 350. As is well known in the art, such position information can be obtained based on other indicia of location, such as network IP address, wireless network triangulation, cellular network triangulation, or even user input.

Under further control of program 360, processor 310 forms crime and traffic accident location information indicated in the form of a street map that is illustrated on display 320.

System Operation

Figure 4:
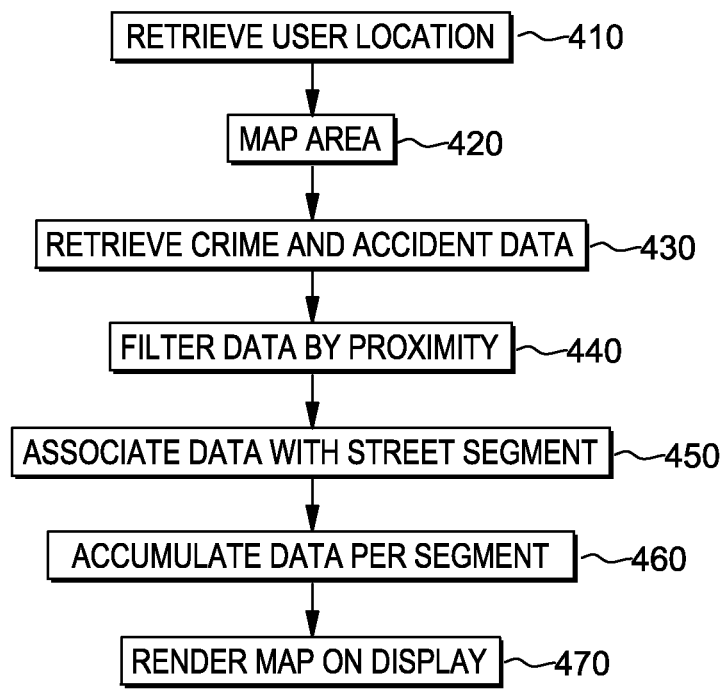
FIG. 4 is a flow diagram illustrating a method of the present invention.

FIGS. 4-8 illustrate a method of analyzing location-based (geocoded) data of the present invention. FIG. 4 is a flow diagram illustrating a method of the present invention. In step 410, program 360 directs processor 310 to retrieve user location information from GPS receiver 350.

In step 420, program 360 directs processor 310 to form a street map having a particular resolution based on the user's current position. As is well known in the art, the user can control the resolution and area displayed through display/interface 320 by employing well known gestures to zoom in or out, scrolling, etc.

In step 430, program 360 directs processor 310 to retrieve crime and accident data from databases that store information associated with the area displayed through display/interface 320.

In step 440, program 360 directs processor 310 to determine the relative location of crime and traffic accident located on the area of street map for display through display/interface 320. This process is shown in more detail in FIG. 5.

Figure 5:
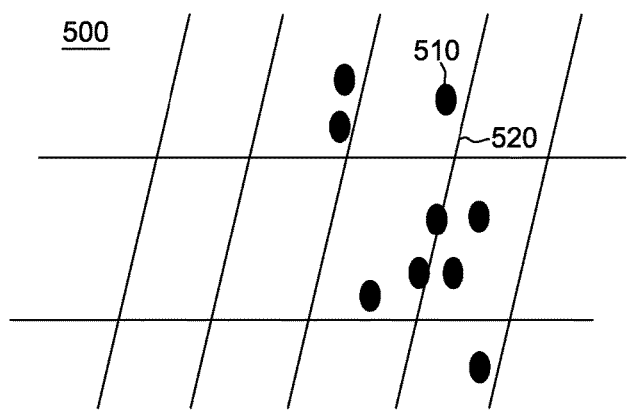
FIG. 5 is a street map illustrating points indicating crime and traffic accident location.

FIG. 5 illustrates points indicating crime and traffic accident location plotted on a street map 500 after geocoding collected crime and traffic accident location data. Street map 500 comprises one or more crime and traffic accident event data 510 and one or more streets 520. As illustratively shown in FIG. 5, at a minimum, a crime and traffic accident location event 510 comprises a geocoded location. In addition, such event information 510 may also include a date/time of the event, type of event, or the source of the data.

Returning now to FIG. 4, in the next step in the process, step 450, program 360 directs processor 310 to associate crime and traffic accident location event data 510 with a particular street segment. This process is shown in more detail in FIG. 6.

Figure 6:
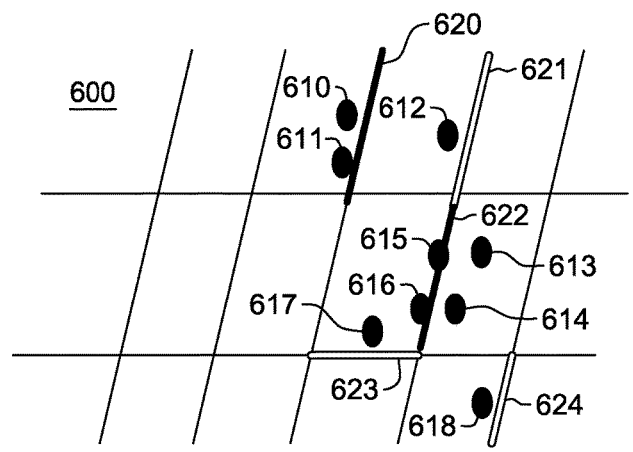
FIG. 6 is a street map illustrating joining geocoded crime or traffic accident points to the closest street segments.

FIG. 6 illustrates how geocoded crime and traffic accident location event data 610-618 are joined to street segments 620-624. Program 360 directs processor 310 to separate streets into street segments at the intersection of the street with other streets, as street line data provided from data sources, such as the U.S. census, are contiguous lines having street names. Then the closest created street segment on street map 600 is selected based on proximity to each crime and traffic accident event. Thus, as shown in FIG. 6, events 610 and 611 are associated with street segment 620. Likewise, event 612 is associated with street segment 621. Events 613-616 are associated with street segment 622. Additionally, event 617 is associated with street segment 623, and event 618 is associated with segment 624.

Returning now to FIG. 4, in the next step in the process, step 460, program 360 directs processor 310 to accumulate data for each street segment based on the activity of events associated with particular street segments. This process is shown in more detail in FIG. 7.

Figure 7:
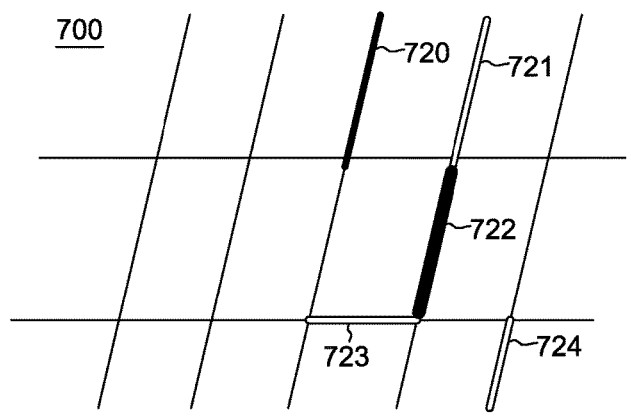
FIG. 7 is a figure that shows low to high density of crime or traffic accident streets.

FIG. 7 is a figure that shows low to high density of crime or traffic accident streets. With comparison to street map 600 illustrated in FIG. 6, those street segments on street map 700 having a high number of events accumulated are coded in a fashion indicating to the user of the severity of risk. For example, street segments 721, 723 and 724 each have a single event associated therewith, and thus are provided with an indication showing a mild amount of activity. Street segment 720 has two events associated therewith, thus a moderate amount of activity is displayed. Finally, street segment 722 has a large amount of events associated therewith, and so a severe amount of activity is indicated. In a preferred embodiment, each street segment is colored a different color based on the accumulated number of incidents adjacent to each street segment. For example, street segments with little or no associated activity can be displayed in green, street segments having moderate activity can be coded in yellow, and segments having a plethora of associated events can be coded in red, where green indicates a safer street, whereas red indicates a street having higher frequency of crimes or traffic accidents.

In an alternative embodiment, program 360 directs processor 310 to form a display map based on the activity of events associated with particular street segments, further based on the current time of day, and the time of event occurrence.

In an alternative embodiment, program 360 directs processor 310 to form a display map based on the activity of events associated with particular street segments, further based on the type of event. For example, the street segments are coded based on crimes against pedestrians, such as assaults or robberies. In another example, the street segments are coded based on vehicular accidents, indicating historically dangerous drivability of street segments. In yet another example, the street segments are coded based on the age of the events, thereby eliminating bias from historically inaccurate, aged data.

Returning now to FIG. 4, in the last step in the process, step 470, program 360 directs processor 310 to render a display map on display/interface 320. An exemplary display map is illustrated in FIG. 8.

Figure 8:
FIG. 8 is an exemplary screen image for a crime or traffic accident street map that provides a graphical representation of streets having criminal and traffic accident risk segments.

FIG. 8 is an exemplary screen image for a crime or traffic accident street map that provides a graphical representation of streets having criminal and traffic accident risk segments. As shown on FIG. 8, display 800 illustrates, proximal to user's location 810, street segments that contain crime and accident event information joined thereto, that allows the user to see detailed information and statistics on any street segment selected by the user. For example, segment 825 has a low crime rate. Street segments 835, 845, 855, and 865 illustrate segments having increasing crime rates. A legend in the lower right corner of display 800 provides markings 820, 830, 840, 850 and 860 to provide the user with an indication of the crime rate for segments shown on the map. A similar map could be generated for traffic accident data, or a combination of both types of events. Users are able to click on the street segment to see more detailed information, or filter based on different types of crime or traffic accidents by different time settings from an options window. All of the street segments contain crime and accident event information joined to particular street segments that allows the user to see detailed information and statistics on any street segment selected by the user.

The description of the present disclosure is merely exemplary in nature and, thus, variations that do not depart from the gist of the disclosure are intended to be within the scope of the disclosure. Such variations are not to be regarded as a departure from the spirit and scope of the disclosure. It is to be understood that the present invention is not limited to the embodiment(s) described above, but encompasses any and all embodiments within the scope of the following claims.

I claim:

1. An apparatus comprising:
   a display;
   a processor;
   a network interface;
   a GPS receiver; and
   a memory storing processor executable instructions that, when executed by the processor, causes the apparatus to:
      determine a user's current location using the GPS receiver;
      determine, based on the user's current location, a map comprising a plurality of streets, wherein the plurality of streets are separated into a plurality of street segments based on intersections of the plurality of streets;

receive crime data that indicates a plurality of crimes that occurred at a plurality of locations;

determine, based on the received crime data and the determined map, a crime map that indicates a respective safety level of the plurality of street segments, wherein the respective safety level of each of the plurality of street segments is based on crimes that occurred adjacent to the respective street segment; and transmit the crime map to the display.

2. The apparatus of claim 1, wherein the processor executable instructions further cause the processor to:

accumulate event data for a plurality of events associated with a closest street segment to the user's location, and determine the closest street segment, wherein the closest street segment indicates a number of crimes from the plurality of events.

3. The apparatus of claim 1, wherein the crime data is imported from a computer aided dispatch system ora recorded management system.

4. The apparatus of claim 1, wherein the crime data further comprises traffic accident event data.

5. The computer system apparatus of claim 2, wherein the crime data further comprises data indicating a type of event, and the processor executable instructions further cause the processor to:

accumulate event data matching a user selected type of event for the plurality of events associated with the closest street segment, and determine the closest street segment, wherein the closest street segment indicates a number of events associated with the user selected type of event.

6. The apparatus of claim 2, wherein the event data further comprises a respective time associated with each of the plurality of events that indicates when the event occurred, and the processor executable instructions further cause the processor to:

accumulate event data matching a user selected time range for the plurality of events associated with the closest street segment, and determine the closest street segment, wherein the closest street segment indicates a number of events associated with the selected time range.

7. A method comprising:

determining a user's current location;

determining, a map comprising a plurality of streets, wherein the plurality of streets are separated into a plurality of street segments based on intersections of the plurality of streets;

determining, based on the user's current location, a closest street segment of the plurality of street segments;

receiving crime data that indicates a plurality of crimes that occurred at a plurality of locations; and determining, based on the received crime data and the closest street segment, a crime map that indicates a safety level of the closest street segment, wherein the safety level of the closest street segment is based on crimes that occurred adjacent to the closest street segment.

8. The method of claim 7, wherein the user's current location is determined by a GPS receiver.

9. The method of claim 7, further comprising accumulating event data for a plurality of events associated with the closest street segment; and determining the closest street segment, wherein the closest street segment indicates a number of the plurality of events accumulated.

10. The method of claim 7, wherein the crime data is imported from computer aided dispatch or recorded management systems.

11. The method of claim 7, wherein the crime data further comprises traffic accident event data.

12. The method of claim 9, wherein the event data further comprises data indicating a type of event, and the method further comprises:

accumulating event data matching a user selected type of event for the plurality of events associated with the closest street segment; and determining a map that illustrates the closest street segment indicating the number of events associated with the user selected type of event.

13. The method of claim 9, wherein the event data further comprises a respective time associated with each of the plurality of events that indicates when the event occurred, and the method further comprises:

accumulating event data matching a user selected time range for the plurality of events associated with the closest street segment; and determining a map that illustrates the closest street segment indicating a number of events associated with the selected time range.

14. A non-transient computer readable storage medium comprising a program that, when loaded in to memory and executed by a processor in a computer, causes the processor to:

determine a user's current location;

determine, a map comprising a plurality of streets, wherein the plurality of streets are separated into a plurality of street segments based on intersections of the plurality of streets;

determine, based on the user's current location, a closest street segment of the plurality of street segments;

receive crime data that indicates a plurality of crimes that occurred at a plurality of locations; and determine, based on the received crime data and the closest street segment, a crime map that indicates a safety level of the closest street segment, wherein the safety level of the closest street segment is based on crimes that occurred adjacent to the closest street segment.

15. The computer readable storage medium of claim 14, wherein the program further causes the processor to:

accumulate event data for a plurality of events associated with the closest street segment; and determine the closest street segment, wherein the closest street segment indicates a number of the plurality of events accumulated.

16. The computer readable storage medium of claim 15, wherein the event data further comprises data indicating a type of event, and the program further causes the processor to:

accumulate event data matching a user selected type of event for the plurality of events associated with the closest street segment; and determine the closest street segment, wherein the closest street segment indicates a number of events associated with the user selected type of event.

17. The computer readable storage medium of claim 15, wherein the event data further comprises a respective time associated with each of the plurality of events that indicates when the event occurred, and the program further causes the processor to:

accumulate event data matching a user selected time range for the plurality of events associated with the closest street segment; and determine the closest street segment, wherein the closest street segment indicates a number of events associated with the selected time range.

18. The computer readable storage medium of claim 14, wherein the user's current location is determined by a GPS receiver.

19. The computer readable storage medium of claim 14, wherein the crime data is imported from a computer aided dispatch system or a recorded management system.

20. The computer readable storage medium of claim 14, wherein the crime data further comprises traffic accident event data.

* * * * *